(12) United States Patent
Rosenfeld et al.

(10) Patent No.: US 7,181,345 B2
(45) Date of Patent: Feb. 20, 2007

(54) LOCATION-BASED WEATHER NOWCAST SYSTEM AND METHOD

(75) Inventors: Daniel Rosenfeld, Jerusalem (IL); Yaron Reich, Herzlia (IL)

(73) Assignee: Nooly Technologies Ltd., Herzlia (IL)

( * ) Notice: Subject to any disclaimer, the term of this patent is extended or adjusted under 35 U.S.C. 154(b) by 0 days.

(21) Appl. No.: 10/450,196

(22) PCT Filed: Dec. 16, 2001

(86) PCT No.: PCT/IL01/01167

§ 371 (c)(1),
(2), (4) Date: Jun. 12, 2003

(87) PCT Pub. No.: WO02/49310

PCT Pub. Date: Jun. 20, 2002

(65) Prior Publication Data

US 2004/0043760 A1    Mar. 4, 2004

Related U.S. Application Data

(60) Provisional application No. 60/256,149, filed on Dec. 15, 2000.

(51) Int. Cl.
*G01W 1/00* (2006.01)
*G01V 3/00* (2006.01)

(52) U.S. Cl. ............................................. 702/3; 702/1

(58) Field of Classification Search ................ 702/1–6; 709/200; 340/540, 601, 1; 342/26
See application file for complete search history.

(56) References Cited

U.S. PATENT DOCUMENTS

| | | | | |
|---|---|---|---|---|
| 5,448,378 A | * | 9/1995 | Matsumoto | 358/468 |
| 5,654,886 A | * | 8/1997 | Zereski et al. | 702/3 |
| 5,940,776 A | * | 8/1999 | Baron et al. | 702/4 |
| 6,018,699 A | * | 1/2000 | Baron et al. | 702/3 |
| 6,023,223 A | * | 2/2000 | Baxter, Jr. | 340/531 |
| 6,164,130 A | * | 12/2000 | Pabst et al. | 73/170.24 |
| 6,169,476 B1 | * | 1/2001 | Flanagan | 340/286.02 |
| 6,275,774 B1 | * | 8/2001 | Baron et al. | 702/3 |
| 6,456,226 B1 | * | 9/2002 | Zheng et al. | 342/26 R |
| 6,563,452 B1 | * | 5/2003 | Zheng et al. | 342/26 R |
| 6,816,878 B1 | * | 11/2004 | Zimmers et al. | 709/200 |
| 6,836,730 B2 | | 12/2004 | Root et al. | |
| 2001/0052847 A1 | * | 12/2001 | Auerbach | 340/540 |

OTHER PUBLICATIONS

Michael Dixon et al.; "TITAN: Thunderstorm Identification, Tracking, Analysis, and Nowcasting—A Radar-based Methodology"; Journal of Atmospheric And Oceanic Technology; vol. 10, No. 6; Dec. 1993; pp. 785-797.

(Continued)

*Primary Examiner*—John Barlow
*Assistant Examiner*—Victor J. Taylor
(74) *Attorney, Agent, or Firm*—Sullivan & Worcester LLP

(57) ABSTRACT

A method for providing a mobile user with updated weather nowcasts comprises: receiving a request from a user, the request being associated with a location, and for a period such as about an hour sending the user regular meteorological information regarding the location. The user may be a mobile telephone user and the location may be determined from the location of the mobile telephone.

44 Claims, 10 Drawing Sheets

OTHER PUBLICATIONS

B. W. Golding; "Nimrod: A System for Generating Automated Very Short Range Forecasts"; Meteorol. Appl.; vol. 5; Year 1998; pp. 1-16.

A. Jaecker-Voirol et al.; "A 3D Regional Scale Photochemical Air Quality Model—Application To a 3 Day Summertime Episode Over Paris"; France; pp. 175-194.

John A. Leese et al.; "An Automated Technique for Obtaining Cloud Motion from Geosynchronous Satellite Data Using Cross Correlation"; Journal of Applied Methodology; vol. 10; pp. 118-132.

Ji Ping Shi et al.; "Regression Modelling of Hourly $NO_x$ And $NO_2$ Concentrations in Urban Air in London"; Atmospheric Environment; vol. 31, No. 24; Year 1997; pp. 4081-4094.

* cited by examiner

Fig. 5a

My profile

Adjust profile: [My Profile ▼] [Submit]

My Location please provide me with information warnings and alerts for the following meteorological items:

- ☐ Rain ○ always ⊗ from: [any ▼]
- ☐ Snow ○ always ⊗ from: [any ▼]
- ☐ Hail ○ always ⊗ from: [moderate ▼]
- ☐ Temperature ○ always ⊗ more than: [10 ▼] less than [30 ▼]
- ☐ Effective temperature (wind-chill factor) ○ always ⊗ above: ○ more than: [10 ▼] / less than [30 ▼]
- ☐ Pollution level in: ○ always ⊗ above:
- ☐ Pollen & allergy related factors
- ☐ Wind speed ☐ Wind direction
- ☐ Sun radiation ⊗ always ○ above
- ☐ Suntan conditions ☐ Surfing conditions [low ▼]

Skin Profile for Sun radiation and Suntan risks

Age [20 – 30 ▼] Skin type: [Normal ▼] natural hair color: [Blond ▼]
Complexion: [Very fair ▼] Freckles [+++ ▼] Sun reaction [sometimes burn ▼]
Tanning [tans easily ▼]

Fig. 5b

*Time schedule :* please provide me with weather related warnings and alerts on a daily basis at the following times:

☐ all day long  ☐ morning (7-12)  ☐ noon (12-16)  ☐ afternoon (16-21)
☐ night (21-00)  ☐ early morning (00-07)
☐ adjust time definition [Morning ▼] from [____] to [____]

☐ Synchronize with my electronic scheduler [Outlook ▼] specify a path [____]

Help: how do I synchronize ?

☐ Including Holidays and national days  ☐ Including weekends

[Submit] [Reset]

*Based on 3rd party location*

Please provide me with short-range meteorological related information warnings and alerts based on the following: [My Son ▼] mobile device ← 112

☐ Rain     ⊗ always
☐ Snow     ○ always
☐ Hail     ○ always
☐ Temperature  ○ always  from: [Any ▼]  ○ more than [10 ▼] / less than [30 ▼]
☐ Effective temperature (wind-chill factor) ○ always  from: [Any ▼]  ○ more than [10 ▼] / less than [30 ▼]
☐ Pollution levels in ○ always  from: [Moderate ▼]  ○ above : [Low ▼]
☐ Pollen & Allergy related factors
☐ Wind speed  ☐ Wind direction  ☐ Surfing conditions
☐ Sun radiation  ○ always  ○ above: [low ▼]
☐ Suntan conditions

Time schedule :

Please provide me weather related warnings and alerts on a daily basis at the following times:

☐ all day long ☐ morning (7-12) ☐ noon (12-16) ☐ afternoon (16-21) ☐ night (21-00)
☐ early morning (00-07)

Please note that for every device the specifications (information warnings & alerts) can be readjusted.

[Submit] [Reset]

Add new device

Device name [____]   please specify your wireless connection provider [AT&T ▼] ← 114

Please enter the wireless device number / ID [____]

[Submit] [Reset]

*Favorite location*

Please provide me with short-range meteorological related information warnings and alerts for the following locations:

Please note that for every location the specifications (information warnings and alerts) can be readjusted.

[House ▼]   [Submit] [Reset]

☐ Rain        ○ always  ○ from: [Any ▼]
☐ Snow        ○ always  ○ from: [Any ▼]
☐ Hail        ○ always  ○ from: [Moderate ▼]
☐ Temperature ○ always  ○ more than [10 ▼] / less than : [30 ▼]
☐ Effective temperature (wind-chill factor) ○ always ○ more than : [10 ▼] / less than : [30 ▼]
☐ Pollution level in ○ always ○ above : [Low ▼]   ☐ Pollen & Allergy related factors
☐ Wind speed ☐ Wind direction ☐ Surfing conditions ☐ Sun radiation ○ always ○ above: [low ▼]
☐ Suntan conditions

Time schedule:
Please provide me with weather related warnings and alerts on a daily basis at the following times:
☐ all day long ☐ morning (7-12) ☐ noon (12-16) ☐ afternoon (16-21) ☐ night (21-00)
☐ early morning (00-07)

Add new location to favorite
Location name [____]
○ Based on the current location of 3rd party device and current location: device Number / I.D. [____]
○ Based on my current location
○ Based on request I made on : (open archive) [Today ▼] time : [1 ▼] [AM ▼]
○ Based on global list of locations : [Global list ▼]
○ Based on known positioning method [GPS ▼]   [Submit]

*Connection for 3rd party device, dedicated / embedded devices and various applications* means of connection:
○ Wireless
○ Other   Connect via [LAN ▼] Communication protocol [TCP/IP ▼]
Specify connection address and device I.D. [____]
Please provide me with short-range meteorological related information warnings and alerts for the following locations:
[House ▼] and based on the following devices : [David Palm ▼]

Fig. 5e

- ☐ Rain ○ always ○ from: [Any ▼]
- ☐ Snow ○ always ○ from: [Any ▼]
- ☐ Hail ○ always ○ from: [Moderate ▼]
- ☐ Temperature ○ always ○ more than: [10 ▼] / less than: [30 ▼]
- ☐ Effective temperature (wind-chill factor) ○ always ○ more than: [10 ▼] / less than: [30 ▼]
- ☐ Pollution level in ○ always ○ above: [Low ▼]
- ☐ Pollen & Allergy related factors
- ☐ Wind speed ☐ Wind direction ☐ Surfing conditions
- ☐ Sun radiation ○ always ○ above: [low ▼]

---

*Time schedule:*

Please provide me with weather related warnings and alerts on a daily bases at the following times ☐ all day long ☐ morning (7-12) ☐ noon (12-16) ☐ afternoon (16-21)
☐ night (21-00) ☐ early morning (00-07)

Adjust time definition [Morning ▼] from [_____] to [_____] [Submit] [Reset]

Update every: ☐ 5 minutes ☐ 15 minutes ☐ 30 minutes ☐ hour

LOCATION-BASED WEATHER NOWCAST SYSTEM AND METHOD

CROSS-REFERENCE TO RELATED APPLICATIONS

This application is a National Phase Entry of PCT/IL01/01 167 filed 16 Dec. 2001, which claims priority from U.S. Provisional Patent Application Ser. No. 60/256,149 filed 15 Dec. 2000.

FIELD OF THE INVENTION

The present invention relates to a system and method for providing individuals with the ability to access information about prevailing weather conditions, on demand. More particularly, the present system and method permit users to request and receive an accurate, immediate, location-based, localized and customized meteorological report which is valid for a short time period. Such weather reporting will be referred to hereinafter as "nowcasting".

BACKGROUND OF THE INVENTION

The weather is a matter that concerns almost all individuals on practically a daily basis. We use weather information for [i] planning what to wear, [ii] how to travel to work, [iii] whether to proceed with planned activities indoors or outdoors, [iv] whether to engage in outside recreational activates, and [v] whether to expect and prepare for days of particularly severe allergen, smog or ultraviolet exposure.

However, the present methods for obtaining information that could aid with making these plans has, until now, been subject to various constraints, which severely limits the usefulness of the preparation. Most broadcast and Internet-available weather reports provide fairly generalized guidance relating to the weather. In particular, the type of information available is usually related to large periods of time, meteorologically speaking, i.e. time periods can range from as short as 6 hours to as long as 5–7 days. Additionally, the geographical constraints of the reporting are usually confined to large areas, ranging from 25 km² to as much as continental distances, common for satellite and radar-image-based reporting on national and international broadcast programming. Even for weather forecasting provided by "local" broadcasts, the geography of any given report is usually based on areas of 5 km radius (about 78 km²), and it is not known at resolutions of areas less than 5 km, 3 km or even 1 km in radius.

Another deficiency of known systems for providing weather information is that the systems usually and necessarily address only a limited number of atmospheric conditions, i.e. precipitation, average temperature or temperature range, very general statements regarding cloudiness and wind conditions (sunny, partly cloudy, overcast, cloudy, stormy, light winds with gusting, high winds, etc.) and always with respect to large geographical areas, not necessarily of concern to the individual listener or viewer. One only hears about smog, ultraviolet or pollen conditions in extreme circumstances. Despite the existence of data gathering systems for many atmospheric conditions and at relatively high resolutions or degrees of localization, there is no known system or method for making the power of such data gathering and processing systems available to the general public. Nor has there been a method or system for permitting the general public to extract specifically desired information.

Known systems for on-demand weather forecasting provided by Websites such as the Weather Channel website or the UK's Met Office Website are available for obtaining limited weather-related information based on relatively low-resolution geographical limitations such as zip (postal) code by clicking on a map. However, these systems are similarly limited in the frequency of the updates of the underlying weather information database from which the user receives the answer to his query. Additionally, the type of information available is essentially completely determined by the information provider and does not in any way relate to the specific real-time needs of the user. Moreover, while the information purports to be postal-code localized, it is in fact often simply drawn from a weather map having information regarding a much larger area, i.e. at a fairly low resolution, and which is refreshed once every hour or less frequently. Such weather forecast is extremely probabilistic, due to the extended periods of time which are sought to be covered (e.g. six hours or more).

People today are more time-constrained than ever before and their leisure time is increasingly fragmented and subject to the mercy of the weather. In general, people need help to make the most from the limited time they have and to improve the quality of their decision-making. In fact, the effects of the weather impacts many aspects of human endeavors.

Thus, there is a demonstrated need for a system that is capable of providing weather information for highly localized areas. Furthermore, there is a need for a system which provides answers to highly individualized weather-related queries. Additionally, the information provided by such a system should offer accurate guidance, i.e. over a short time period (less than one hour).

The system should be able to answer individual needs and demands, and offer information that is both accurate and easily and cheaply accessible.

The information offered should cover all various angles of interest—a person suffering from asthma or allergies could find out, for example, the fog status in London or the pollen count in Teaneck, N.J. with the same kind of ease and convenience as finding out rain predictions for the following weekend.

OBJECTS AND SUMMARY OF THE INVENTION

Therefore it is an object of the present invention to provide a user with easy access to individualized information regarding meteorological conditions.

It is a further object of the present invention to provide a user with a user-friendly means for obtaining highly localized meteorological condition reporting.

It is a further objective of the present invention to enable a mobile user to get real-time information about the environmental and meteorological changes that are expected with a high level of certainty to occur in the immediate future.

It is a further objective of the present invention to enable a user to get personal environmental and meteorological data for different specified geographical locations based on a preselectable personal profile.

It is yet a further object of the present invention to create a direct weather-interactive relationship between point-of-sale marketing and the immediate weather, for example emphasizing an on-sale item according to real-time weather conditions. For example, offering "new umbrellas at $9.99" in the face of an eminent rapid-onset rain storm.

Yet a further object of the present invention can be integration into a "smart" house that can be proactive in advance of real-time weather changes, for example: closing the windows when heavy rain/dust storm is expected, adjusting an air-conditioning system to a real-time change in pollution levels or local sunshine levels, etc.

Still a further object of the present invention is to provide integration of public transportation arrival/departure information with local, immediate nowcast information, thereby enabling commuters to decide, for example, whether to wait in pleasant weather for a delayed train or to start looking for a more immediate transportation alternatives in view of an oncoming or merely apparent thunder storm.

Yet a further object of the present invention can permit the creation of individualized weather alerts to notify an individual of the occurrence or impending occurrence of a specific weather condition. For example, a mother can request notification, by e-mail, SMS text, paging or cell phone call-back or any wireless data related warning such as animated icon with sound on GPRS network, if the weather in the park where her children are playing is presently or about to become adverse.

These objectives and others not mentioned hereinabove are accomplished by the system and method of the present invention in which an end-user uses a simple, user-friendly interface on an Internet browser, WAP, GPRS or any other data/voice network interface to either activate a saved nowcast profile (saved locally or on a nowcast provider's server), or to construct and execute a new query to obtain selectable meteorological information. The interface and/or query are transmitted over a public communication network, such as the Internet or a cellular phone network (or by any other means) to a nowcast-provider's system. Once the end-user selects the parameters of the data she wants, i.e. the type of meteorological condition that interests her, the location of interest, and the time frame and time intervals of interest (up to one hour, as frequent as one-minute intervals based on data-refresh intervals as often as once every 5 minutes), the software of the present invention builds and initiates a request for the development and delivery of a time evolution for the end-user-selected nowcast parameters based either on the actual location of the end-user as determined for example by cellular locating technology, GPS location, or end-user input (especially if the end-user is interested in a location remote from her immediate network connection vicinity).

The nowcast-provider's server communicates with servers at meteorological centers (private or governmental), downloads and Processes raw meteorological data such as satellite and radar maps using special meteorological methods and algorithms to provide a nowcasting map of the location of interest, comprising a series of time slice intervals as small as 1 km$^2$ in area for a variety of meteorological and environmental information for time periods of from 1 minute to 60 minutes. The maps are translated to user-friendly tables and a reply is generated and returned to the end-user.

Different maps may be generated according to their end-user demands. Exemplary embodiments of uses include when a extreme sports tour company asks to receive accurate data that concerns them and their clients with real-time information of severe weather heading towards their location. Nursing home personnel may be interested in local smog density mapping as that may affect residents that remain outdoors or that are on field trips. Teacher's may want UV radiation mapping to be warned of changes in potential sun exposure due to changing local cloud conditions, etc.

In an exemplary embodiment of the present invention, end-users can create an alert enquiry whereby the nowcast-provider updates the mapping for particular parameters and creates an alert which is sent to the end-user upon the occurrence of the under-defined trigger.

In another exemplary embodiment, a smart house or other intelligent structure can be programmed to respond to nowcast alerts by preparing or adjusting the home's environmental control settings for the current climactic conditions. For example, a house connected to the Internet that also has automated environmental controls can close it's windows and activate air filters when alerted that a smog condition or brush fire smoke condition is approaching. The same house can close windows before a rainstorm starts, and reopen them when the rain has passed. The house can lower shades before the sun starts to shine intensely. A home in a region where outside temperatures are shifting dramatically can anticipate the shifting outside temperature fluctuations with more energy-conserving measures like opening or closing windows, as appropriate, rather than remaining closed all day and relying solely on an air-conditioning system's thermostat. Similarly, a smart house can be informed of impending strong wind conditions and store, move or otherwise protect outside fixtures, such as a satellite dish.

In another exemplary embodiment of the present invention, communications companies can use the information from nowcasting to anticipate and prevent weather-related service outages, for example, when a satellite television company receives an alert of severe incoming weather at a particular download station, it can temporarily reroute the traffic to and from that station to a station outside the impact zone until the severe weather condition subsides and or alert its end users of possible difficulties in receptions and when the broadcast is expected to return to normal quality.

BRIEF DESCRIPTION OF THE DRAWINGS

The following detailed description of exemplary embodiments of the present invention can best be understood by reference to the accompanying drawings, in which:

FIGS. 5a–e illustrate components of an example of the input fields for establishing or modifying an end-user's personal nowcast profile and alerts.

DETAILED DESCRIPTION OF THE INVENTION

Figure 1:
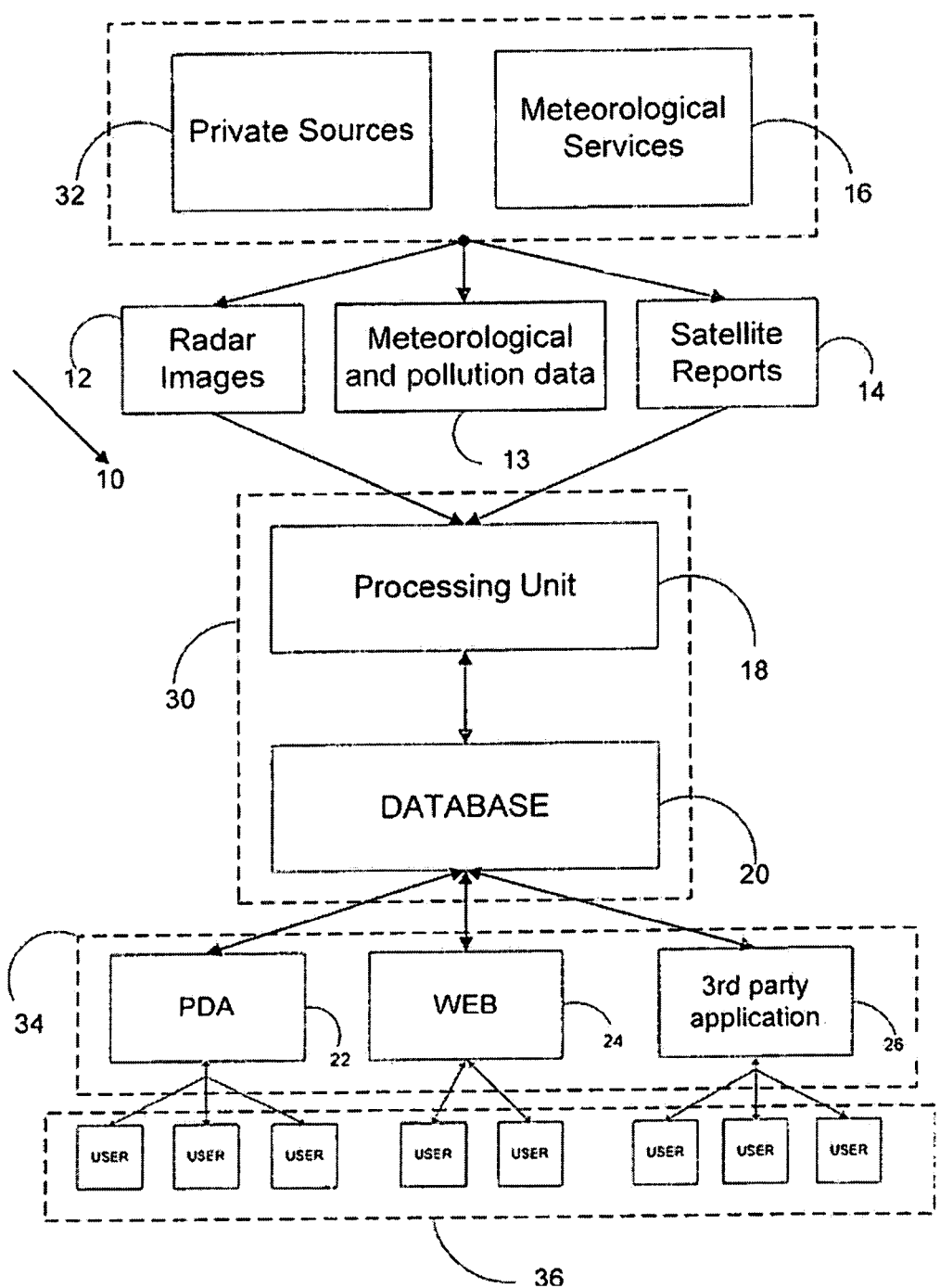
FIG. 1 is a block diagram representing a location-based nowcasting system according to an exemplary embodiment of the present invention.

With reference to FIG. 1, an exemplary embodiment of a location-based nowcasting system 10 according to the present invention comprises a processing unit 18 and a meteorological database 20 located at a nowcast request processor 30. Nowcast request processor 30 can be a server and can be located at or in communication with meteorological centers or as privately owned or operated centers by private companies, such as cellular communications, news and weather information providers and the like.

End-users 36 use various means of communication, such as Internet enabled PCs, wireless PDAs, cellular phones, alphanumeric pagers, and the like to be connected with a WAN such as the Internet, or a cellular communications network, via local clients 22, 24 and 26, with examples here shown as wireless content providers, WAP service providers, Internet service providers (ISPs) and third-party content and data providers, respectively. Local clients 22, 24 and 26 could each have incorporated therein a nowcast request processor 30, or they could be communicatively connected to a remote nowcast request processor 30.

A nowcast request is initiated by an end-user 36, or may be programmed to auto-initiate, and is transmitted to the nowcast request processor 30, via its appropriate local client 22, 24, or 26, which transmits the request to a nowcast request processor 30. Methods for user creation and initiation of the request will be described in further detail herein below with reference to FIGS. 6a–e

In one exemplary embodiment, the processing unit 18 receives a request and first determines if the request relates to a geographical region which is "covered" by the particular nowcast request processor 30 or if the region about which the request is concerned is covered by a different nowcast request processor 30. If the latter, the request is forwarded to the appropriate nowcast request processor 30 and if the former, a processing stage is entered. In another exemplary embodiment, the determination of which nowcast request processor 30 should process the request can be made by the local client 34. The processing unit 18 is in a constant state of requesting, receiving and analyzing a variety of data such as Doppler and radar images 12 and satellite images 14 wind direction and speed measurements, supplied by local or external meteorological services 16 or by private sources 32, in addition to data from environmental air sampling stations for pollen, smog, and pollutants, and topographical data.

EXAMPLES OF DATA SOURCES AND DATA DERIVED THEREFROM

1. Weather satellites
   Data source: Met-Service or Nooly's own reception station.
   Satellite type: METEOSAT Second Generation (for Israel and the European coverage). GOES for the western hemisphere.
   Data frequency: Every 15 minutes.
   Satellite parameters: Radiation at 12 wavelengths in the visible and infra-red.
   Satellite data resolution: 4 km.
   Retrieved meteorological parameters:
   Surface temperature
   Cloud properties:
     Existence
     Height
     Thickness
     Type: rain bearing or nice weather cloud
     Movement
     Development trend
   Dust storms or large scale air pollution
2. Weather radars
   Data source: Met-Service.
   Radar type: Doppler radar transmitting at a wavelength of 5 or 10 cm.
   Data frequency: Every 1 to 5 minutes. Data resolution: 1 km radially by 1 degree azimuthally.
   Radar parameters:
   Precipitation reflectivity
   Radial velocity
   Retrieved meteorological parameters:
   Precipitation existence and type: rain, hail, snow
   Precipitation intensity: light, moderate, heavy
   Precipitation Movement
   Precipitation Development trend
   Winds
3. Automatic weather stations
   Data source: Met-Service.
   Data frequency: Every 10 minutes
   Reported parameters:
   Wind direction and velocity
   Temperature
   Humidity
   Solar radiation
   UV radiation
   Rain intensity
   Barometric pressure
4. Air pollution monitoring stations
   Data source: EPA, Municipalities, power generation utilities, etc.
   Data frequency: Every 10 minutes to 1 hour.
   Reported parameters:
   Pollutant gases: Ozone, $SO_2$, Nox, CO
   Pollutant particles: PM10, PM2.5
5. Short range forecasts standard meteorological gridded data:
   Data source: Met-Service.
   Forecast range: The forecast is based on data collected 6 to 12 hours before present. The forecast range can be for anywhere from 0 to 5 days.
   Forecast methodology: The forecast is computed by weather models that calculate the meteorological parameters at grid resolution of several tens of km. The forecasted fields are for air pressure, temperature, humidity, winds, clouds and precipitation.
   Forecast accuracy: The shorter the time into the future about which one is producing a forecast, the greater will be the accuracy of the forecast. The best accuracy therefore is for the immediate future. However, even an "immediate future" that is based on data collected 6 to 12 hours before the present (because the collection and calculation times take that long) will have accuracy that is already degraded to the extent that it cannot resolve events (e.g., start and stop of rain) and provide only probabilistic forecast, at geographical accuracy of many tens of km.
6. Geographical information:
   Topographical maps
   Pollution sources and their dependence on time of the day and day of the week.
   Geographical latitude, longitude, and the time of the day, as they determine the position of the sun and its energy output reaching the atmosphere and the surface.
   Sea surface temperature.

As mentioned hereinabove, the above data sources, at a level of detail necessary for producing a truly accurate nowcast, are not available for the general public, and even if they were, the analysis of the data to the accuracy required to produce an individualized nowcast in a few minutes (or less) is beyond human skills without the aid of the algorithms for data-gathering and processing which are described herein.

Figure 3:
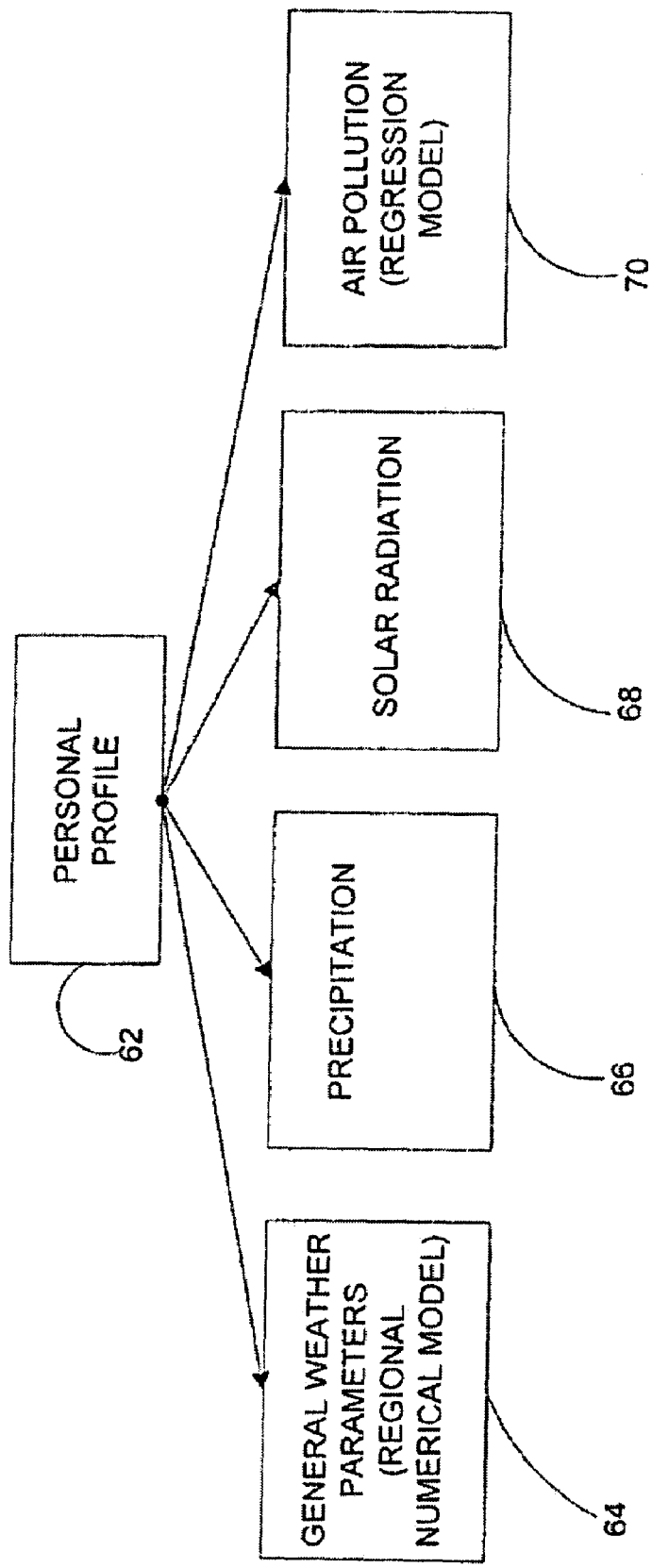
FIG. 3 is a flowchart illustrating an example of some of the possible components of an end-user's personal nowcasting profile in accordance with an exemplary embodiment of the present invention.

The processing unit 18 uses algorithms for analyzing meteorological data (as will be described further herein below with reference to FIGS. 3 and 4). In the processing stage, the processing unit 18 extracts the specific time slice maps relevant to answering the request and prepares a weather nowcast, in layman's terms, to be sent back to the end-user in response, relating to a tightly focused target area for up to a 60 minute total time period in increments as small as 1 minute apart.

After the processing stage, the nowcasts are sent from the nowcast request processor 30 to the end-user's device (PC, notepad, cel phone, wireless PDA, pager, embedded device, 3rd party application etc), via the appropriate local clients 22, 24, 26. It should be understood that the nowcast request processor can be physically located in the same place as the local client 34.

A 3rd party application user can be a private, or a governmental company giving its clients essential nowcasting information. For example a 3rd party application can be placed at local branches of a national supermarket chain. In those branches where heavy rain is about to begin falling, large screens can anticipate the weather change by recommending that customers buy an umbrella due to the heavy rain that will start falling in about 10 minutes for an hour, or be prepared to have a cup of hot chocolate at the store's café to wait out the rain, rather than go wandering aimlessly in the downpour. In branches where the temperature is about to spike upwards to 35° C. for the next 40 minutes, customers at the checkout counter can be advised to buy a cold drink and a hat to beat the coming heat.

In one exemplary embodiment, each local client 34 can choose from a large variety of meteorological data that sort and level of data which it wishes to make available to its end-users 36. Local clients 34 receive personal requests from end-users 36, and provide a personalized nowcasting service to each end-user 36 based on the end-user location and personal profile (as will be described below in reference to FIGS. 5a–e).

For example traffic web sites, or cellular companies that give information about traffic jams, can use the nowcast system to recommend to the end local client 34 the best and driest way to their home, work or any place they want to get to. For safety, end users 34 may receive nowcast data from the nowcast request processor 30 with information regarding foggy and freezing roads in their path. The local clients 34 receive detailed maps of a wanted zones with information about the exact places it will rain, or stop raining in the next 10, 20, 30 . . . 60 minutes and other meteorological and environment information (as will be described below in reference to FIG. 2) and transmit the nowcasting data to their end-user's 36. In a further exemplary embodiment, a cellular local client 22, can even use cellular locating technology to pinpoint the end-user's location and direction of travel or profiled destination to automatically provide specific meteorological information to the end-user about his path home or to work. In cars equipped with trip computers, the information regarding weather-related road conditions could even be fed to the driver via the computer or even used to automatically adjust the vehicle for dealing with the upcoming weather (for example automatically shifting from 2-wheel drive to 4-wheel drive, or turning on fog lights).

Figure 2:
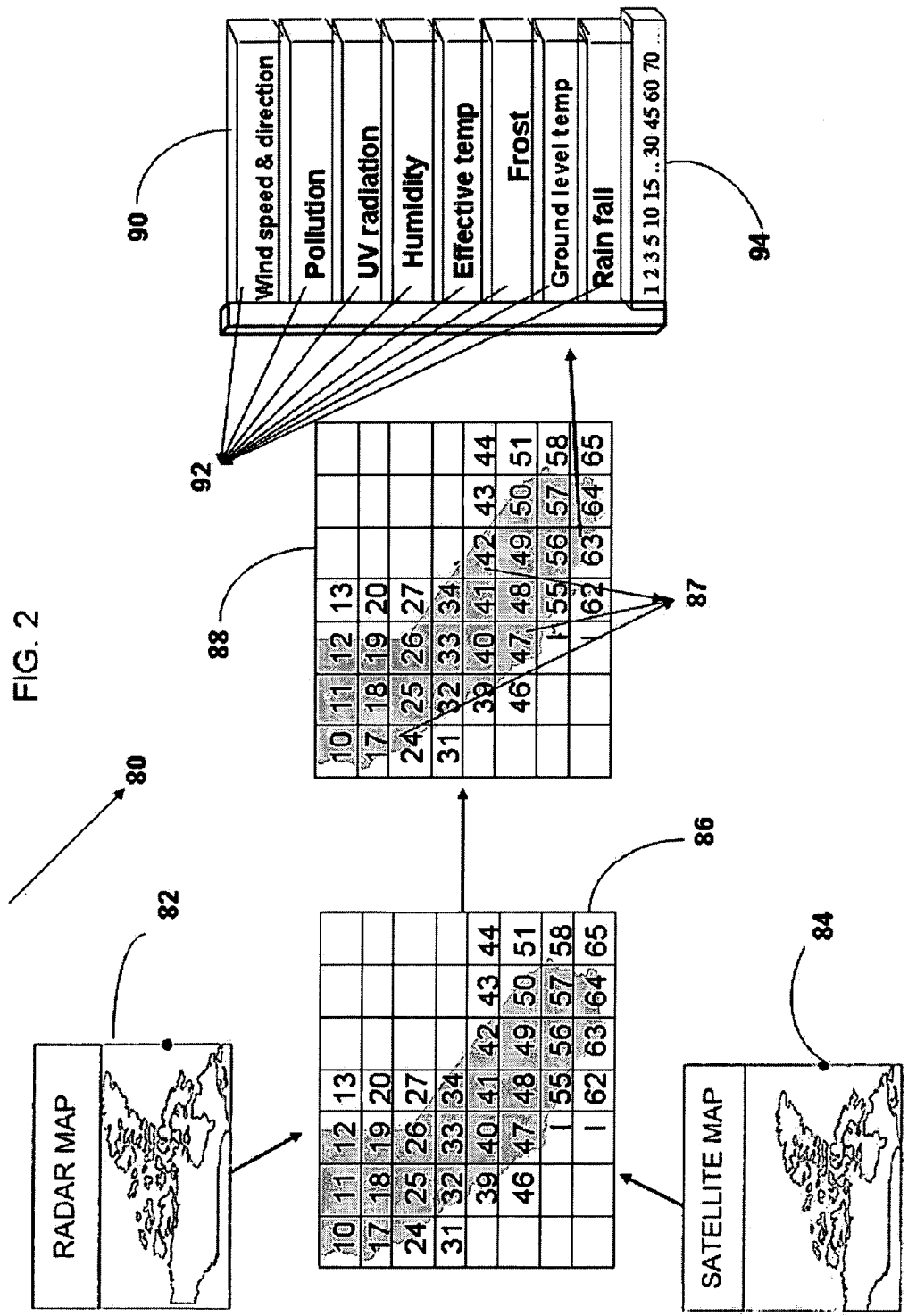
FIG. 2 depicts two zone maps and a personal nowcasting matrix according to an an exemplary embodiment of the present invention.

With reference to FIG. 2, an example of the process 80 of building a time slice matrix 90 incorporates taking data from radar maps 82 and satellite imagery maps 84 as well as topographical maps and whatever other data maps are relevant to the request (UV, smog, pollen) to build a master map by overlaying the maps. The master map 86 is then compartmentalized and the data from each strip of compartments 87 is then stored in a matrix 90.

In order to supply the end user 36 with personal and exact weather nowcasting data according to his present and future position in the next 10, 20 . . . 60 minutes timeslice maps are made which are based on the data in the matrix 90 for the relevant strip of compartments 87.

The general map 86 includes different weather data (parameters) such as temperature, humidity, and wind direction, solar radiation data, and other environmental parameters. The uniqueness and the advantages of the general map 86 are mainly due to the exact weather data the map supplies. This data is achieved by using an algorithms that are highly accurate for stating weather conditions in the immediate future, i.e. a period of less then 60 minutes, and for areas of 5 km radius or less (as will be further explained in FIG. 3).

For example, general map 86 comprises accurate forecasts over a broad geographical region for a given time. General map 86 is divided into a large number of small, defined zone cells 87 as depicted by zone map. From zone map 88, personal nowcasting matrix 90 is built for each zone cell 87. Weather data such as pollution, humidity, rainfall, and temperature 92 are placed at the perpendicular side of the table 90, while a time line 1 to 60 minutes 94 is placed at the horizontal column of the table 90. Each cell 87 of the zone map 88 has up to 60 columns of data, one row for each kind of data and one column for each minute (although the number 60 could be raised to accommodate the development of more more highly accurate weather algorithms ro to reflect the user's willingness to accept nowcasts with a larger margin of error, particularly as time wears on).

With reference to FIGS. 3 and 6a–e, a customer service unit 60 shows different nowcast parameters 61 an end-user 36 can activate by transmitting his request (including his personal profile) 100 to a local client 34. The personal profile may be user-defined by using the input fields shown in FIGS. 6a–6e. the parameters 61 are shown here as divided into 4 groups based on the complexity of the underlying algorithms and the difficulty of deriving data therefor. However, it should be understood that further (or fewer) subdivisions may be used in building a nowcasting system and this arrangement has been selected solely to aid in the understanding of the present invention.

The process begins by initializing a nowcast query list containing a user location and personal profile 100. The user location may be determined based on a handset location using a GPS-based service or cell locating technology enabling the end-user to transmit his exact location in real time. The location could also be at a remote location or defined according to a user's needs in the near future, for example if end-user 36 wants to receive nowcasting information or weather alerts, about weather at the park where his children are playing, he can input the exact location of the park directly into his PC, mobile device, interactive TV and receive back the nowcast of the relevant area. Or end user 36 can input the location where he expects to be about one half-hour hence.

After the query list 100 is appropriately filled by the end-user 36 it is transmitted to the local client 34, where the request is handled and sent back to the end-user 36. The end-user 36 receives individualized nowcasting data, based on parameters specified in his personal profile 100 such as, general nowcasting weather parameters 64 (wind, air temperature, surface temperature relative humidity etc.), precipitation 66, solar radiation 68, and air pollution 70.

With respect to a request which includes a query for general nowcasting weather parameters 64, one of two different processes occurs depending on the end-user request. If the request refers to real-time weather parameters the end user will receive real-time measurements of the weather parameter downloaded from a meteorological service network (where available). However, if the end-user 36 asks for a nowcast for weather parameters 10, 20 . . . 60 minutes later, then the requested parameters are extrapolated in time by according to the principles of applying a regional numerical model.

In one exemplary embodiment, end-user 36 derives nowcasting data concerning precipitation 66, by extracting precipitation intensity from nowcasting maps 86, 88 (as described in FIG. 2) using a nowcasting algorithm at the time and location requested by the end-user 36. At the end of the process the end-user receives results of precipitation intensity selected from one of the four intensity categories: 1) no rain; 2) light; 3) moderate; and 4) heavy. The user not only gets information about the rain intensity but also its pattern i.e. will it suddenly become a heavy rain or will it slowly become moderate, etc. and when these changes are expected to occur.

Solar and UV radiation data 68 are derived and transmitted to the end-user 36, taking into account astronomical configurations, and by subtracting cloud scattering retrieved from satellite maps. Air pollution data 70 is transmitted to the end-user 36 by activating two different processes according to the end-user request (personal profile 100). If the end-user 36 asks for real-time air pollution data the system will send him at least an average (if not more precise) pollutant concentration data based on a monitoring station within a given radius. If the end-user asks for air pollution data for the next 10, 20 . . . 60 minutes, the nowcasting system 10 activates an extrapolating process using a regression model with input from a regional numerical model.

For further guidance on how to implement the above-described methods for deriving UV and air pollution data, reference may be had to: *Atmospheric Environment*, Shi, Ji Ping and Harrison, Roy M., Oxford, England, 31(24): 4081–4094, December 1997, Refs., FIGS., tables; and *A 3D regional scale photochemical air quality model application to a 3 day summertime episode over Paris*. Jaecker-Voirol, A. et al. , Air pollution IV: monitoring, simulation and control., Caussade, B.; Power, H. and Brebbia, C. A. (eds.), Computational Mechanics Publications, 1996. pp. 175–194, Refs., FIGS.

Figure 4:
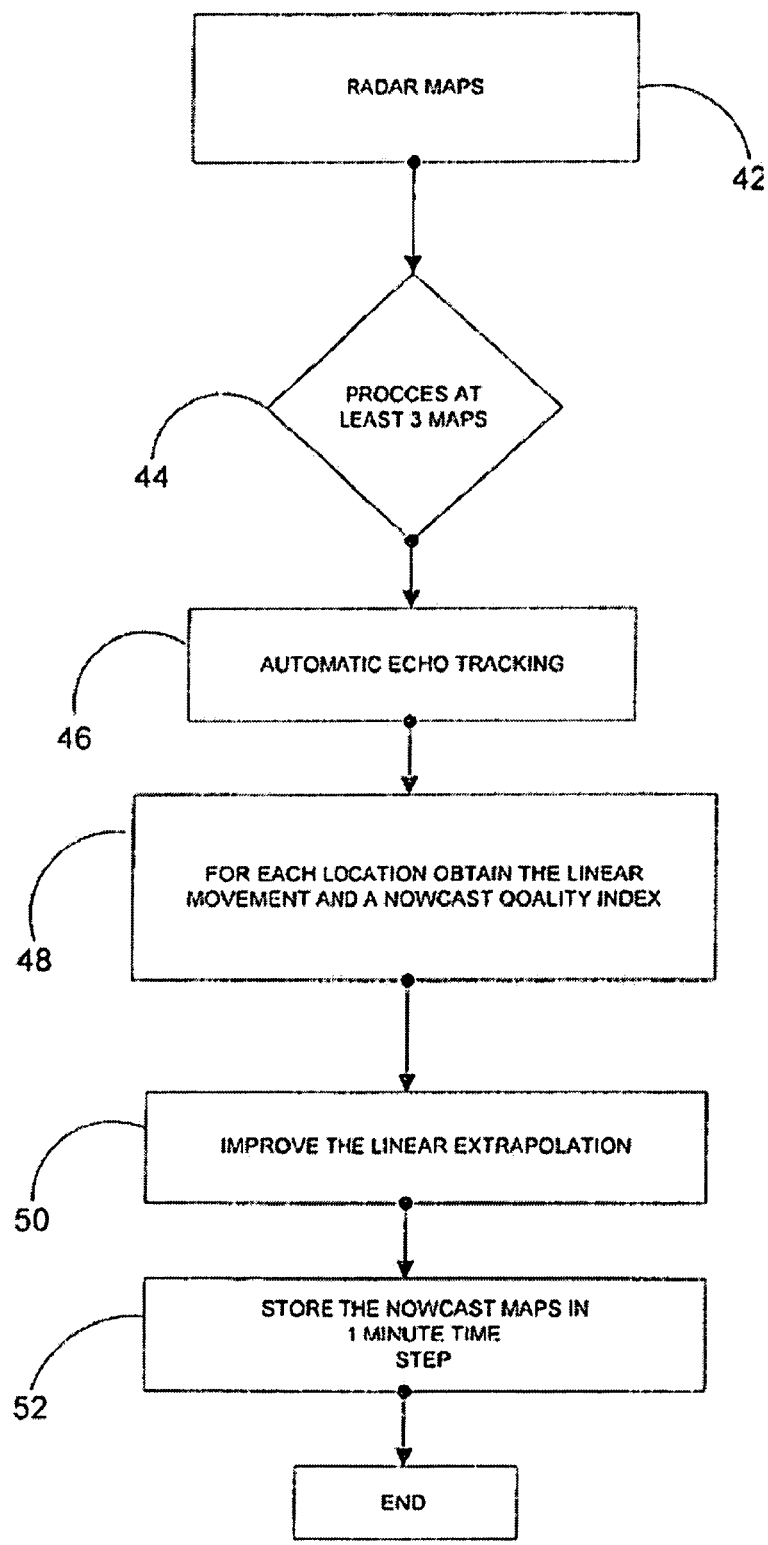
FIG. 4 illustrates an exemplary embodiment of a flow chart describing an algorithm in accordance with one exemplary embodiment of the present invention.

Referring now to FIG. 4, the precipitation nowcasting algorithm may be based on combinations of different analytic weather forecast methods combining different meteorological maps (radar maps, satellite maps, topographic maps etc.). The process begins 42 by receiving radar maps 12 for the last 5 minutes from meteorological sources as mentioned in FIG. 1.

In step 46 automatic echo tracking is activated after at least 3 radar maps 12 are available 44. Precipitation echo tracking and forecasting is a known procedure for tracking evolution and motion of individual clouds. It is known that young clouds are small with strong intensities, and with the maturing of the clouds they dissipate by spreading over large areas with weak intensities. In order to identify the growth and decay of cloud areas it is needed to track the time histories of the echo cells to determine in what stage of their lifecycle they are in.

The radar tracking examines the following two elements:
  a. Vertical profile of intensity: At the growing stage, the precipitation is still at the upper portion of the cloud, and its top is gaining height. At the decaying stages the top descends, and the intensities are greatest near the surface and decaying aloft.
  b. Horizontal profile: A developing storm has compact structure-growing intensities in time, and sharp horizontal gradient of the intensities. A decaying rain cloud is spreading out to larger area on expense on its intensities.

To complete the picture from radar tracking, satellite images are used. The satellite images are received from meteorological resources as mentioned hereinabove, and are used to seek areas of growth of new elements that still aren't precipitating. The new growing cloudy areas precede the precipitation by 15 to 30 minutes. The cloud tops have to grow above a certain height for start producing precipitation. That height is determined by comparison the satellite data with the radar, finding out what is the cloud with the warmest top that still develops precipitation.

Three more meteorological analyzing methods, that contribute to completing the nowcasting process are:
[1] the use of Doppler winds to identify areas of converging winds, which precede the formation of clouds. Such features are the basis of forecasting cloud and precipitation development at the time range of one to three hours;
[2] use of topographical features 330 for modifying the precipitation forecast. The measures are based on the fact that clouds develop more extensively while ascending on a higher ground, and dissipate while moving downhill;
[3] use of surface temperature for better prediction of the evolution of clouds. Clouds prefer to develop over warmer surface, feeding on the heat energy. For example, on a hot summer day, clouds would form preferentially on the heat island generated by a city. That heat is mapped already by the other data sources, and be used quantitatively in the forecast.

The above operations can be performed, in a simple form, based on the following algorithm:
  1. Take the time series of the radar maps for the last 5 minutes 42.
  2. Identify the linear movement of the weather radar echoes, by cross correlation or other methods.
  3. Advance the current radar map according to the movement found in step 2, for 1, 2, 3, . . . 60 minutes in the future, and by that obtain forecasted radar maps for that time interval.
  4. Interpret the radar echoes into the various weather elements over the point of interest 87 (the location selected by the end-user), and obtain the weather in that location as a function of time, in 1-minute increments, for the next one hour. The interpretation takes into account the temperature and humidity near the surface and structure of the radar echoes, according to principles known in radar meteorology.
  5. Extract from this forecasted weather record the parameters of interest to the user, and transmit them per request, or initiate the transmission if conditions for an alert were fulfilled.

Methods for automatic echo tracking using cross correlation methods have been known since 70's; for example, see, Dixon, M., and G. Wiener, 1993: TITAN: Thunderstorm Identification, Tracking, Analysis, and Nowcasting a radar-based methodology. Journal of Atmospheric and Oceanic Technology, Boston, Mass., 10(6): 785–797, December 1993; Golding, B. W. (1998): Nimrod: a system for generating automated very short range forecasts. Meteorological Applications, Reading Berkshire, UK, 5(1):1–16; and Leese, J. A., C. S. Novak, and B. B. Clark (1971): An automatic technique for obtaining cloud motion from geostationary satellite data using cross correlation. J. Appl. Meteorology, 10, 118–132.

For each location 87 a linear movement and a forecast quality index are obtained 48. The process continues in step 50 with improving the linear extrapolation by incorporating trend analysis, external meteorological data and geographical information for example as follows:

1. Combining our existing radar map data with high frequency multispectral geostationary satellite data (GOES and MSG satellite series, providing scans at least once every 15 minutes), thereby allowing identification of growing cloud elements before precipitation starts, usually an area of great deficiency in radar-based forecasting, i.e. the identification of newly developing rain areas that are not observed at the current time;
2. Identification of the development trends according to 3-dimensional evolution of the radar echo field. For example, new developing showers have small intensities over small horizontal areas and large vertical extent, with peak intensities aloft. Over time the intensities spread to cover larger horizontal area and lower altitudes. In the dissipation stage small intensities are spread over relatively large area; and
3. Additional geographical factors, such as topographically induced enhancement.

The process 52 ends by storing in the processing unit 18 a nowcasting data map for each minute.

With reference to FIG. 5 a screen shot 100 depicting an exemplary embodiment of a nowcasting graphical user interface (GUI) input screen shows different sections the end-user can fill in order to request nowcasting data on a customized and individualized basis, to indicate personal preferences and to establish parameters for alerts relating to various weather conditions. Section 102 illustrates the different meteorological parameters 104 the end-user 36 can select for receiving warnings and alerts during any time of the day concerning the meteorological parameters he selected. For example a sea surfer can get alerts for good wind and surfing conditions directly to his cel phone. Sections 106 illustrate an end-user personal skin profile according to the end-user 36 requests for a selected time 108. Section 110 illustrate a $3^{rd}$ party location personal profile used to receive meteorological data at a $3^{rd}$ party location selected from list 112, to any kind of device 114 the end user selects. The end-user can select his favorite location from section 116.

Figure 6:
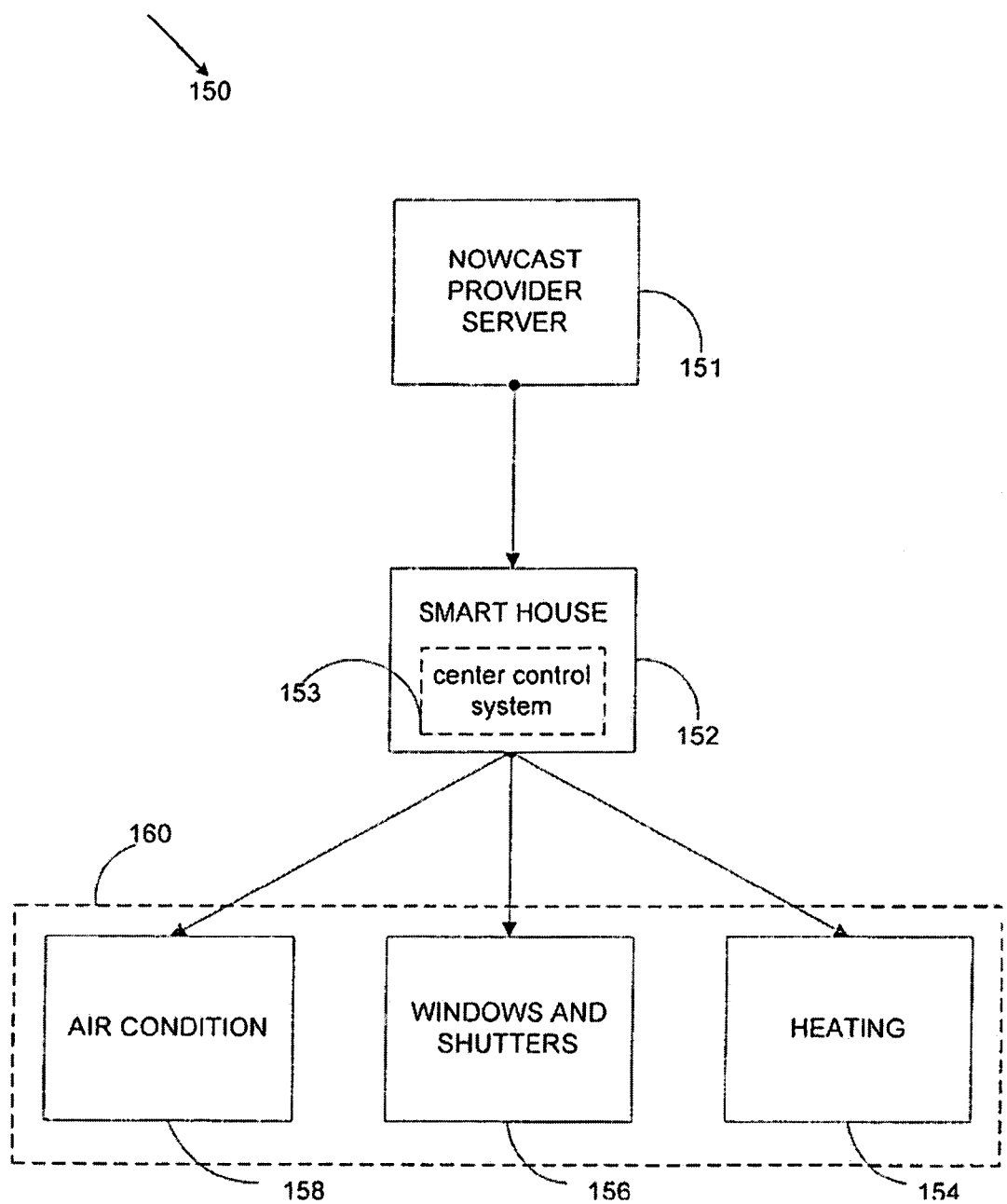
FIG. 6 illustrates application of an exemplary embodiment of the present invention to an intelligent building structure.

With reference to FIG. 6, there is shown an exemplary embodiment of a combination between a "smart" house 152 (or any smart intelligent structure, like a warehouse, greenhouse, office building, factory or any other commercial or industrial improvement) and a nowcast server provider 151. A central automation controller 153 in the smart house 152 is connected to the nowcast provider server 151, via a network and is programmed to respond to nowcast alerts, the response being to prepare or adjust the home's environmental control settings 160 for the current climactic conditions.

What is claimed is:

1. A method for providing a meteorological nowcast according to a location for a user, comprising:
    receiving a weather forecast request from an individual user, said request being associated with a location,
    determining an area of up to about 5 kilometers in radius; and providing an updated meteorological nowcast requested by said user at intervals over a period of less than about 60 minutes in said area.

2. The method of claim 1, wherein said determining said area further comprises:
    determining a current location of the user for use as said location.

3. The method of claim 2, wherein the current location is determined according to a location of a wireless device.

4. The method of claim 2, wherein the current location is determined according to a location of a GPS device.

5. The method of claim 2, wherein the current location is determined according to a location of a landmark.

6. The method of claim 2, wherein the current location is determined according to information provided by the user.

7. The method of claim 2, wherein the current location is determined according to information provided by a third party device.

8. The method of claim 1, wherein said request is associated with a location of interest to the user.

9. The method of claim 8, wherein said location of interest is provided by the user.

10. The method of claim 8, wherein said nowcast is formed by combining a plurality of weather parameters.

11. The method of claim 10, wherein said plurality of weather parameters comprises type, intensity, development and movement of a precipitation.

12. The method of claim 10, wherein said plurality of weather parameters further comprises cloud properties such as existence, height, thickness, cloud movement, and development of clouds.

13. The method of claim 10, wherein said plurality of weather parameters further comprises wind direction, velocity, temperature, effective temperature (windchill factor), humidity, solar radiation, ultraviolet (u.v.) radiation, and barometric pressure.

14. The method of claim 10, wherein said plurality of weather parameters further comprises pollution data.

15. The method of claim 14, wherein said pollution data comprises information about at least one of pollutant gases, pollutant particles or pollen.

16. The method of claim 10, wherein said plurality of weather parameters further comprises environmental parameters.

17. The method of claim 16, wherein said plurality of weather parameters further comprises heat stress, wind-chill factor, frost, safe exposure time for various skin types, safe time for avoiding heat stroke, and air quality health index.

18. The method of claim 1, wherein said area is about 1 square kilometer and wherein said intervals are portions of about one minute each.

19. The method of claim 18, wherein determining the meteorological nowcast is performed according to a deterministic algorithm.

20. The method of claim 1, wherein said intervals are portions of about five minutes each.

21. The method of claim 1, wherein said meteorological nowcast is formed by combining data from a plurality of different sources having different resolutions in at least one of time or time.

22. The method of claim 21, further comprising:
    displaying information about the meteorological nowcast to the user.

23. The method of claim 22, wherein said displaying said information is performed on at least one of a computer, a PDA, a cellular telephone, a pager, a dedicated display device or a public display.

24. The method of claim 22, wherein said displaying said information is performed on at least one of a third party device or hardware, said hardware featuring a dedicated chip.

25. The method of claim 23, wherein said displaying said information is performed on a third-party application.

26. The method of claim 25, wherein said third-party application is operated for a business promotion.

27. The method of claim 25, wherein personalized information about the user is stored on a database accessible to said third-party application.

28. The method of claim 21, wherein said plurality of different sources comprises at least two of weather satellites, weather radar, air quality monitoring stations, or national meteorological services.

29. The method of claim 28, wherein said plurality of different sources comprises at least one of weather satellite data, weather radar data, or air quality data.

30. The method of claim 28, wherein said plurality of different sources comprises at least one of a solar map, an ultra-violet light map, a pollution map, a topographical map, a satellite imagery map, a radar map, and a pollen map.

31. The method of claim 21, wherein said meteorological nowcast is determined by:
constructing a map over a geographical region for a given time; and
dividing said map into a plurality of cells to form a zone map, wherein said determining the meteorological forecast is performed separately for each cell.

32. The method of claim 31, wherein said dividing further comprises building a Nowcasting matrix for each cell, wherein each cell has a resolution of about one minute.

33. The method of claim 31, wherein said dividing further comprises building a Nowcasting matrix for each cell, wherein each cell has a resolution of about five minutes.

34. The method of claim 21, wherein said meteorological nowcast is determined by:
constructing a map over a geographical region for a given time; and
dividing said map into a plurality of cells to form a zone map, wherein said determining the meteorological forecast is performed for a plurality of cells corresponding to a meteorological feature.

35. The method of claim 34, wherein said dividing further comprises building a Nowcasting matrix for each cell.

36. The method of claim 21, wherein the meteorological nowcast is determined for operating a smart house.

37. The method of claim 21, wherein the meteorological forecast is determined for a moving vehicle.

38. The method of claim 1, wherein a length of said period is determined according to a request by a user.

39. The method of claim 1, wherein a time of initiation of said period is determined according to a request by a user.

40. The method of claim 1, when at least one of said period and said area is determined according to a profile about a user.

41. The method of claim 40, wherein said profile is determined according to information submitted by said user.

42. The method of claim 40, further comprising:
displaying information about the meteorological forecast to the user by a device determined according to said profile.

43. A method for providing a location-based nowcast, wherein the nowcast is determined according to a location of less than about 5 km radius, the method comprising:
(a) initiating a request, by a user, for a time evolution of user selected nowcast parameters, by transmission of said request over a public communication network to a computer, wherein said time evolution is performed for a period of less than about 60 minutes;
(b) determining location of user cell;
(c) receiving raw data from a plurality of sources, said raw data containing information about at least two of a plurality of geophysical parameters;
(d) processing said raw data to create a time-series of forecasted parameters maps;
(e) extracting a time evolution of user requested nowcast parameters from said time-series of forecasted parameter maps by positioning said cell on said time series; and
(f) distributing information to said user about the user-selected nowcast parameter within said time evolution.

44. A method for providing a location-based nowcast for a user, wherein the nowcast is determined according to an area of less than about 5 km radius, the method comprising:
(a) dynamically determining a location for the user;
(b) receiving raw data from a plurality of sources, said raw data containing information about at least one geophysical parameter;
(c) processing said raw data to create a weather map over a geographical region for a given time;
(d) dividing said weather map into a plurality of cells to form a zone map;
(e) determining the nowcast for a plurality of cells corresponding to a meteorological feature, and
(f) Sending said user a weather nowcast of a corresponding map cell.

* * * * *